United States Patent
Han et al.

(10) Patent No.: US 6,214,404 B1
(45) Date of Patent: Apr. 10, 2001

(54) INCORPORATION OF SUPERSATURATED LACTOSE IN PROCESS CHEESE AND PRODUCT THEREOF

(75) Inventors: Xiao-Qing Han, Naperville, IL (US); Joseph E. Spradlin, Hot Springs, AK (US)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/325,577

(22) Filed: Jun. 3, 1999

(51) Int. Cl.$^7$ .............................. A23C 19/08; A23C 21/06
(52) U.S. Cl. ........................... 426/582; 426/522; 426/583
(58) Field of Search ................................. 426/582, 583, 426/522

(56) References Cited

U.S. PATENT DOCUMENTS

| | | | |
|---|---|---|---|
| 4,036,999 | * 7/1977 | Grindstaff | 426/583 |
| 4,048,346 | 9/1977 | Stoller | 426/583 |
| 4,166,142 | * 8/1979 | Chang | 421/582 |
| 4,500,549 | 2/1985 | Crossman | 426/33 |
| 4,955,363 | 9/1990 | Harju et al. | 99/5 |
| 5,714,075 | 2/1998 | Brian et al. | 210/670 |

OTHER PUBLICATIONS

Kosikowski, Cheese and Fermented Foods, 2$^{nd}$ ed., Edwards Brothers, Inc., Ann Arbor, MI, 1977, pp. 451–458.

Ernstrom et al., *J. Dairy Science* 63:228–234 (1980).

Banks, JM, Stewart, G., Muir, DD and West, IG [1987]. Increasing the yield of Cheddar cheese by the acidification of milk containing heat–denatured whey protein. *Milchwissenschaft 42* (4), pp. 212–215.

Law, AJR, Banks, JM, Horne, DS, Leaver, J. and West, IG [1994]. Denaturation of the whey proteins in heated milk and their incorporation into Cheddar cheese. *Milchwissenschaft 49* (2), pp. 63–67.

Guinee, Timothy P., Pudja, Predrag D., Reville, William J., Harrington, Dermot, Mulholland, Edward O., Cotter, Myriam, and Cogan, Timothy M: [1995]. Composition, Microstructure and Maturation of Semi–hard Cheeses From High Protein Ultrafiltered Milk Retentates With Different Levels of Denatured Whey Protein. *Int. Dairy Journal 5*, pp. 543–568.

Dybing, ST and Smith, DE [1998]. Dairy Foods—The Ability of Phosphates or –Carrageenan to Coagulate Whey Proteins and the Possible Uses of Such Coagula in Cheese Manufacture. *J. Dairy Sci 81* (2) pp. 309–317.

* cited by examiner

*Primary Examiner*—Helen Pratt
(74) *Attorney, Agent, or Firm*—Fitch, Even, Tabin & Flannery

(57) ABSTRACT

The present invention discloses a method of preparing a process cheese containing lactose wherein the cheese remains free of lactose crystals. The method includes a step in which a dairy liquid is heated at a temperature, and for a duration in time, that are sufficient to inhibit or prevent crystallization of the lactose after formation of the process cheese. The ratio of dairy liquid to cheese is from about 1:1 to about 3:1 by weight. The invention additionally discloses the lactose-containing process cheese stabilized against the formation of lactose crystals, prepared by the process of the invention.

20 Claims, 1 Drawing Sheet

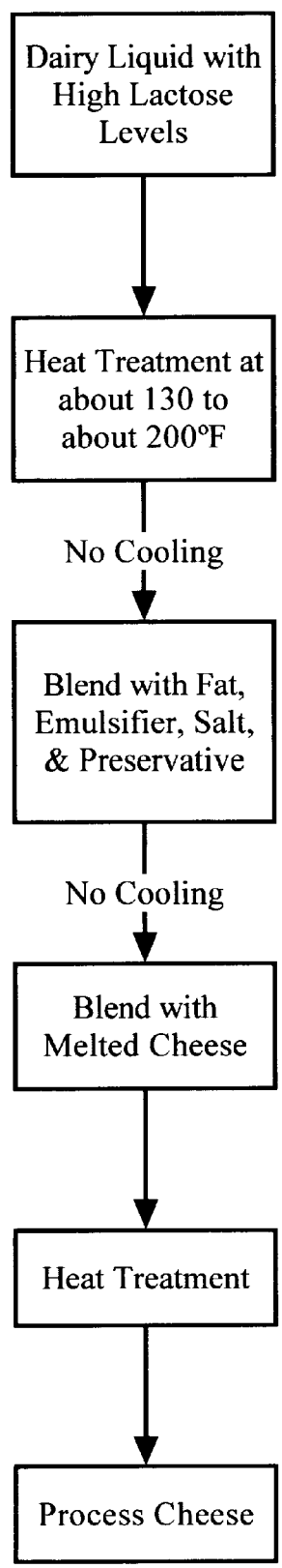
Figure

INCORPORATION OF SUPERSATURATED LACTOSE IN PROCESS CHEESE AND PRODUCT THEREOF

FIELD OF THE INVENTION

The present invention relates to utilization of whey in the preparation of a process cheese. Whey, a by-product arising from the manufacture of cheese, contains significant amounts of lactose, which if incorporated into cheese products at relatively high levels,, may crystallize during storage and produce an undesirable gritty texture. The invention describes a process that prevents or inhibits the crystallization of lactose from a state of supersaturation when lactose-containing whey is incorporated into a process cheese product. This process allows whey to be incorporated in process cheese without reducing the level of lactose in the whey prior to the incorporation step.

BACKGROUND OF THE INVENTION

Cheese compositions are prepared from dairy liquids by processes that include treating the liquid with a coagulating or clotting agent. The coagulating agent may be a curding enzyme, an acid, or a suitable bacterial culture, or it may include such a culture. The coagulum or curd that results generally incorporates transformed casein, fats including natural butter fat, and flavorings that arise especially when a bacterial culture is used. The curd is separated from the liquid whey, which contains substances not affected by the coagulation, and which therefore are not incorporated into the coagulum. Whey is thus a byproduct of manufacturing and commercial processes that produce food products such as cheeses. Whey contains soluble substances, such as lactose, and proteins, such as β-lactoglobulin and α-lactalbumin, with molecular weights of about 18 kDa and about 14 kDa, respectively; other proteins include serum albumin, immunoglobulins, and K casein digestion products. Since large quantities of whey are available from the side streams of the food producing processes mentioned above, it would be desirable to increase utilization of the components of whey in the manufacture of dairy products in order to increase the utilization of the raw milk starting material and thereby enhance overall efficiency. The inability of whey proteins to be retained in the coagulum is an important factor contributing to a lack of efficiency in the production of cheese. Such problems have been recognized for many years.

Several methods have been proposed with the objective of recovering whey proteins in cheese products. Many of them include process steps that, although not emphasized, retain or concentrate lactose as well. For example, whey proteins have been concentrated or dried from whey, and then recombined with cheese (see, e.g., Kosikowski, Cheese and Fermented Foods, 2nd ed., Edwards Brothers, Inc., Ann Arbor, Mich., 1977, pp. 451–458). Unfortunately, in such procedures the recovered whey constituents do not have the appropriate physical and chemical properties conducive to making high quality natural cheeses or process cheeses.

Ernstrom et al. (J. Dairy Science 63:2298–234 (1980)) provide a process in which milk is concentrated to about 20% of the original volume by ultrafiltration and evaporation; the lactose content is modulated by diafiltration. The resulting composition is then inoculated with a cheese starter, which also ferments the remaining lactose, and forms a cheese base. In this process, therefore, the lactose is consumed in fermentation rather than retained in a final cheese product.

Banks et al. (Milchwissenschaft 42:212–215 (1987)) disclose that heating milk at temperatures from 95° C. to 140° C. and then acidifying permits a modest increase in protein content in Cheddar cheese. A bitter off-flavor developed in this process. Law et al. (Milchwissenschaft 49:63–37 (1994)) report that heat treatment of milk prior to cheddaring results in reduction of proteins in whey or in acid filtrates of the milk.

Dybing et al. (J. Dairy Sci. 81:309–317 (1998)) provide a process for incorporating whey protein into cheese curd by concentrating the components, coagulating whey proteins using a variety of agents, and renneting a composition containing the coagulated whey protein and concentrated milk components. It was found, however, that these methods did not succeed in producing whey protein coagula that were recovered as cheese.

Guinee et al. (Int. Dairy Journal 5:543–568 (1995)) recently evaluated the state of the art for incorporating whey protein into cheese. High-heat treatment of milk is reported to impair rennet coagulation, curd syneresis, curd structure and texture, and functional properties such as meltability and stretchability. Guinee et al. discuss physical and chemical factors that may be responsible for these effects. Using heat treatments that denature whey protein in milk compositions, they prepared semi-hard cheeses that result from curding such treated compositions. They found that the curd obtained in this way has high whey protein levels, but also high moisture level, low pH value, poor curd fusion and low yield (fracture) values during ripening.

U.S. Pat. No. 5,714,075 relates a method of processing a waste stream generated in a cheese-making process that includes binding anionic components such as sialyloligosaccharides in the waste stream to an anion exchange resin and eluting the anionic components as lithium salts. The lithium salts of the waste stream anionic components are then recovered as solids.

Whey is the aqueous liquid remaining after cheese curds, containing fat, casein, and other components, are produced from a dairy liquid. The composition of whey typically is about 6% solids, of which about 60–70% is lactose. Lactose is a sugar having relatively limited solubility in water. Nevertheless, as with many other sugars, the rate of crystallization of lactose is very slow, requiring days or weeks, depending on conditions. Under the conditions of low water activity prevalent in cheese products, the crystallizability of lactose tends to be enhanced. Such lactose crystals may require several weeks to appear. Thus, even if lactose were present in a cheese formulation at a concentration representing a supersaturated state, crystal formation could be delayed well into a period of storage during shipment, sale, and storage in the home prior to consumption. The presence of lactose crystals, however, would have a severe adverse effect on the mouthfeel of any cheese product in which they might appear, and would deter the consumer from purchasing a product known to engender such crystals.

U.S. Pat. No. 4,048,346 discloses a method of stabilizing a concentrated lactose mixture obtained, for example, from cheese whey by adding to the mixture certain lignin sulfonates in an amount sufficient to retard crystal growth of the lactose. The concentration of lactose is from about 20% to about 35% by weight. The invention also relates to an animal food supplement including a concentrated whey and an amount of certain lignin sulfonates sufficient to retard crystal growth of lactose in the concentrated whey.

U.S. Pat. No. 4,955,363 discloses a method of recovering crystalline lactose from whey. The whey is concentrated, and part of the lactose is crystallized and isolated. The mother liquor is then purified by heating it to about 60° C. to 70° C. at a pH of about 5.8 to 7.0 to form a precipitate which is removed by centrifugation, and the purified mother liquor is treated by chromatography over a sulphonated polystyrene resin to recover a fraction containing lactose which is passed to the crystallization step. In an example, a whey concentrate with a solids content of 58% was crystallized, providing lactose crystals and a mother liquor containing about 27% lactose and about 13% protein by weight.

U.S. Pat. No. 4,500,549 discloses cheese flavoring agents and cheese flavor enhances in the form of enzyme-modified, lactose-hydrolyzed whey or whey fractions. The products have a flavor profile characteristic of aged cheese and a flavor intensity sufficient to serve as the sole source of cheese flavor or cheese flavor enhance in food products.

As may be seen from the above summary, the problem of lactose crystallization in cheeses has not been adequately addressed in the dairy arts. This is surprising in view of the long-felt need in the dairy industry to significantly increase the utilization of components, such as whey proteins, present in byproducts and side streams in the manufacture of dairy products while maintaining organoleptic and other desirable properties. The present inventors provide methods which allow high levels of lactose (i.e., supersaturated levels) but avoids the undesired effect of lactose crystallization even over prolonged storage times.

SUMMARY OF THE INVENTION

The present invention provides a method of incorporating whey into process cheese wherein lactose, even at supersaturated levels, will not significantly crystalize at refrigeration temperatures during prolonged storage (i.e.., about 7 months or longer). Generally, levels of lactose in process cheese at supersaturated levels (i.e., greater than about 17 percent lactose in the moisture phase) are undesirable because the lactose tends to crystalize during storage, thereby yielding an undesirable gritty texture. The present method avoids the crystallization problem or defect normally associated with such high levels of lactose (i.e., supersaturation levels such that the lactose would tend to crystalize upon storage in a conventional process cheese). Using the present process, whey containing relatively high levels of lactose can be incorporated into process cheese. As used herein, "high levels" (or comparable terms) of lactose relate to lactose concentrations which, in a conventional process cheese product, would crystallize but for the process of the invention. Lactose, even at supersaturated levels, in such process cheese as prepared in this invention does not form significant levels of crystals upon storage at refrigeration temperatures. For purposes of this invention, a "significant level or amount" (or comparable terms) of lactose crystals is intended to mean a level above which conventional process cheese would have a gritty texture due to lactose crystal formation.

The present invention discloses a method of preparing a process cheese containing high levels of lactose, wherein the cheese remains significantly free of lactose crystals during storage at refrigeration temperatures, the method including the steps of:

(1) preparing a dairy liquid containing lactose at a concentration sufficient to provide a high level of lactose in the process cheese;

(2) heating the dairy liquid at a temperature and for a time sufficient to inhibit or prevent significant crystallization of the lactose after formation of the process cheese;

(3) blending the heated dairy liquid, without cooling, with fat, an emulsifier, salt, and a preservative to form a heated dairy blend;

(4) blending the heated dairy blend with a melted cheese to yield a melted cheese blend;

(5) heating the melted cheese blend at a temperature between about 170° F. and about 200° F. for between about one minute and ten minutes to provide the process cheese; and (6) packaging the process cheese;

whereby the process cheese remains significantly free of lactose crystals upon storage at refrigerated temperatures.

In favorable embodiments, the dairy liquid is chosen from the group consisting of whole milk, reduced fat milk, skim milk, concentrated milk, ultrafiltered (UF) milk, whey protein concentrate, reconstituted dry whole milk, reconstituted dry reduced fat milk, reconstituted dry skim milk, protein fortified milk (whole, reduced fat, or skim), calcium fortified milk (whole, reduced fat, or skim), and mixtures thereof. In further favorable embodiments, the ratio of dairy liquid to cheese used to prepare the process cheese is from about 1:1 to about 3:1 by weight, and more preferably about 1.2:1 to about 2.4:1 by weight.

In other important aspects, the dairy liquid is heated in step (2) at a temperature of from about 130° F. to about 200° F. for about 2 min to about 100 min. Still more importantly, the dairy liquid is heated in step (2) at a temperature of from about 145° F. to about 170° F. for about 5 min to about 25 min.

In other significant embodiments the fat includes butter or butterfat and the emulsifier is chosen from the group consisting of sodium tripolyphosphate, monosodium phosphate, disodium phosphate, sodium acid pyrophosphate, sodium citrate, sodium metaphosphate, ammonium phosphate, ammonium citrate, and mixtures thereof. Suitable preservative includes sorbic acid or a salt thereof. In yet additional embodiments, the cheese used to prepare the process cheese is Cheddar, Colby, Monterey jack, Havarti, Muenster, Brick, Gouda, and mixtures thereof.

The invention additionally provides a lactose-containing process cheese stabilized against the formation of significant lactose crystals during storage, said process cheese be prepared by a process comprising:

(1) preparing a dairy liquid containing lactose at a concentration sufficient to provide a high level of lactose in the process cheese;

(2) heating the dairy liquid at a temperature and for a time sufficient to inhibit or prevent significant crystallization of the lactose after formation of the process cheese;

(3) blending the heated dairy liquid, without cooling, with fat, an emulsifier, salt, and a preservative to form a heated dairy blend;

(4) blending the heated dairy blend with a melted cheese to yield a melted cheese blend;

(5) heating the melted cheese blend at a temperature between about 170° F. and about 200° F. for between about one minute and ten minutes to provide the process cheese; and (6) deaerating and packaging the process cheese;

whereby the process cheese is stabilized against the formation of significant lactose crystals upon storage at refrigerated temperatures.

The processes of the invention, and the process cheese product prepared using these processes, succeed in incorporating lactose at concentrations corresponding to supersaturation under the conditions of storage without leading to significant crystallization of the lactose in the product. Other negative consequences of including lactose, such as browning and increased melting temperature, are likewise avoided. This is accomplished by providing a process and an environment in the product that retards lactose crystallization, and improves the texture of the final products by providing essentially full hydration of the dairy proteins, essentially complete elimination of lactose crystal memory, and partial denaturation of whey protein incorporated into the process cheese. These advantages are accomplished without requiring the addition of any new ingredients, and with no additional capital equipment requirements. Therefore, it can lead to significant productivity savings for processed cheese products. Other advantages of the processes and the product include improved melting characteristics of the processed cheese, increased stability against microbial contamination, and better microstructure due to improved distribution of ingredients upon blending.

BRIEF DESCRIPTION OF THE DRAWING

The FIGURE provides a flow chart illustrating the invention.

DETAILED DESCRIPTION OF THE INVENTION

The present invention provides compositions, and methods of preparing and using them, that offer improved utilization of components present as whey components in dairy byproducts and/or side streams. The starting material of the present invention is a dairy liquid that generally includes milk proteins, such as, for example, casein and/or whey protein, and lactose. As used herein, "dairy liquid" relates to milk, milk products obtained by fractionating raw milk to provide a liquid fraction, or a solid milk fraction that is reconstituted to a liquid, all of which retain most or all of the lactose present in raw milk. For example, the milk may be treated to remove some or all of the butterfat, providing reduced fat or low fat milk or fat-free or skim milk, respectively. Furthermore, whole milk, low fat milk, or skim milk may be concentrated by methods such as evaporation, ultrafiltration, and/or diafiltration, and the like, or by combinations of such methods. Evaporation provides dairy liquids containing a higher concentration of all the nonvolatile components, including lactose, whereas ultrafiltration, which passes lactose to the filtrate, provides dairy liquids with a higher concentration of the components that are nonpermeable to the ultrafiltration membrane but leaves the lactose, while reduced in amount, at the same concentration in the retentate as it had in the starting liquid. Diafiltration retains the high molecular weight components, but in contrast to ultrafiltration, may modulate the concentration of lactose in the retentate. In any case, the dairy proteins including casein and whey protein are included among the retained solids, such that their concentrations in the resulting liquids are increased. Furthermore any of the above dairy liquids may be evaporated to dryness, providing milk solids including lactose originating from whole milk, low fat milk, or skim milk. Any of these solids may be reconstituted by the addition of water or a suitable aqueous composition including milk or a milk fraction. Reconstitution of dry milks thus provides dairy liquids that in general may have a broad range of final concentrations of the component proteins, butterfat, lactose, and other components. All the above liquids are included in the designation of "dairy liquids" as used herein.

The dairy liquids employed in the present invention may originate from any lactating livestock animal whose milk is useful as a source of human food. Such livestock animals include, by way of nonlimiting example, cows, buffalo, other ruminants, goats, sheep, and the like. Generally, however, cows' milk is the preferred dairy liquid used in the practice of the invention.

As used herein, the term "dairy liquid" further encompasses whey or liquids obtained from whey. Whey is a dairy liquid obtained as a supernatant of the curds when milk or a dairy liquid containing milk components are curded to produce a cheese-making curd as a semisolid. It includes most or essentially all the lactose originally present in the dairy liquid before curding. Whey also generally includes whey proteins, including the globular proteins β-lactoglobulin and α-lactalbumin, and it may further include significantly lower concentrations of immunoglobulin and other globulins, and albumin. Furthermore, as with other dairy liquids, whey may be concentrated by evaporation, including evaporation to dryness, or by ultrafiltration or diafiltration. In the present invention, attention is focused on those dairy liquids processed to retain essentially all the lactose originally in a starting composition. Any whey derived material, such as a whey concentrate, or a dry whey solid, may be reconstituted by the addition of water to obtain a liquid which is likewise encompassed within the term "dairy liquid" as used herein. The dairy liquid is chosen from among whole milk, reduced fat milk, skim milk, concentrated milk, ultrafiltered (UF) milk, whey protein concentrate, reconstituted dry whole milk, reconstituted dry reduced fat milk, reconstituted dry skim milk, protein fortified milk (whole, reduced fat, or skim), calcium fortified milk (whole, reduced fat, or skim), and mixtures thereof. Additionally, the ratio of dairy liquid to cheese used to prepare the process cheese is from about 1:1 to about 3:1 by weight, and more preferably about 1.2:1 to about 2.4:1 by weight.

The dairy liquid employed in the present invention contains lactose at a concentration high enough that the lactose would crystallize, but for the process of the invention, after the dairy liquid is blended with a melted cheese, if the resulting process cheese were stored at a refrigerated temperature for a sufficiently long time. An important feature of the present invention is that the process disclosed herein serves to inhibit or prevent such crystallization of lactose under conditions of refrigerated storage of the process cheese for a reasonable period of time. Generally, such a reasonable period is one considered sufficient for packaging, distribution, sale, and storage in the consumer's home before consumption. For example, the process cheese produced by the method of this invention is considered to be stable against the crystallization of lactose for a period of time such as, for example, about seven months at normal refrigeration conditions.

The FIGURE provides a simplified flow chart to illustrate the process used to practice the invention. In the process of the invention, the dairy liquid containing lactose is heated at a temperature, and for a duration in time, that are sufficient to inhibit or prevent crystallization of the lactose after formation of the process cheese. In this regard, crystallization of lactose in the process cheese product differs considerably from the crystallization of lactose in a simple two-component single phase system such as an aqueous solution or syrup of lactose. In the process cheese product, the water activity is considerably lower than in an aqueous solution, the number of phases is greater than one (including interfaces between aqueous and immiscible nonaqueous phases), and the process cheese product may include emulsified microphases. All these distinctions may act to enhance the tendency for lactose to crystallize in conventional cheese products compared to that in an aqueous single phase system.

Without wishing to be limited by theory, it is believed that, in the present inventive method, the heat treatment of the dairy liquid accomplishes results that include essentially full hydration of proteins (i.e., effective dispersion, dissolution and solvation of the proteins of the dairy liquid), essentially complete removal of lactose crystal memory (i.e., effective molecular dispersion and dissolution of all lactose present such that essentially no microcrystals of lactose remain which could act as seeds for later crystallization), and partial denaturation of the whey proteins in the dairy liquid. These factors appear to minimize or prevent significant crystallization of lactose in the process cheese product upon storage. In other words, it appears that the lactose in the inventive process cheese remains in the supersaturated state for a longer period of time during storage at refrigeration temperatures than conventional products containing a similar amount of lactose. The heating is carried out, for example, at a temperature of from about 130 to about 200° F. and for a duration of about 2 to about 100 minutes. Preferably, the dairy liquid is heated at a temperature of from about 145 to about 170° F. for about 5 to about 25 minutes.

The heated dairy liquid is then blended, without cooling, with one or more process cheese components such as a fat, an emulsifier, a salt, and a preservative, thereby yielding a heated dairy blend. Thus, the temperature of the heated dairy liquid is not allowed to significantly drop (i.e., it remains within about 100° F. to about 150° F., and preferably at about 130° F., close to the temperature obtained during the heat treatment step) before the process cheese components are added. The components may be mixed together in a single composition, or they may be added in two or more compositions. In important embodiments, the fat includes butter or butterfat; the emulsifier is chosen from sodium tripolyphosphate, disodium phosphate, sodium acid pyrophosphate, sodium citrate, sodium metaphosphate, ammonium phosphate, ammonium citrate, and mixtures thereof; and the preservative includes sorbic acid or a salt thereof, and may also include other food grade preservatives. The heated dairy liquid and these components are blended together at a temperature that is at or close to the temperature achieved during the heat treatment step (i.e., within about 150° F. to about 190° F., and preferably within about 165° F. to about 185° F.). Importantly, the heated dairy liquid is not cooled or allowed to cool significantly during this step or before being added to the melted cheese in the next step. It is an important feature of the invention that the heated dairy blend be prepared at this elevated temperature. As a result of this blending, an emulsion of the dairy liquid and the added components is formed at an elevated temperature close to that of the heat treatment step. This step contributes to the inventive feature of the method, namely, preventing or inhibiting crystallization of lactose in the final process cheese product.

The heated dairy blend is then further blended with a composition including melted cheese to yield a melted cheese blend. The melted cheese used to form the blend is normally at a temperature of about 140° F. to about 190° F. and preferably about 160° F. to about 180° F. The cheese employed are conventional cheeses used to make process cheese. These cheese include, by way of nonlimiting examples, Cheddar, Colby, Monterey jack, Havarti, Muenster, Brick, Gouda, and mixtures thereof. In addition to cheese, the composition may include colorants, flavorants, and the like, in order to prepare a process cheese product with high organoleptic appeal for the consumer. The melted cheese blend is then heated at a temperature between about 170° F. and about 200° F. for between about one minute and ten minutes to provide the process cheese. The process cheese may then optionally be deaerated, and is packaged in package sizes suitable for distribution, sale, and consumption by the public.

The supersaturated lactose-containing process cheese provided by the inventive process is stabilized against the formation of lactose crystals during storage at refrigerated temperature. It includes a dairy liquid that contains lactose at a concentration high enough (i.e., supersaturation) that it would crystallize, but for the present method, during storage at refrigerated temperatures. The process cheese also includes one or more compositions that, taken together, provide fat, at least one emulsifier, and at least one preservative for the process cheese, and a composition including cheese. The starting dairy liquid is chosen from among whole milk, reduced fat milk, skim milk, reconstituted dry whole milk, reconstituted dry reduced fat milk, reconstituted dry skim milk, protein fortified milk (whole, reduced fat, or skim), calcium fortified milk (whole, reduced fat, or skim), and mixtures thereof. The ratio of dairy liquid to cheese used to prepare the process cheese is from about 1:1 to about 3:1 by weight, and more preferably about 1.2:1 to about 2.4:1 by weight. In important embodiments, the fat is, or contains, butter or butterfat, and the preservative is, or contains, sorbic acid or a salt thereof, and may contain other food grade preservatives as well. Additionally, the cheese is chosen from the group consisting of Cheddar, Colby, Monterey jack, Havarti, Muenster, Brick, Gouda, and mixtures thereof.

This invention succeeds in preventing significant crystallization of lactose in process cheese even when the lactose is incorporated at an elevated concentration that corresponds to supersaturation under the conditions of storage of the cheese. By permitting use of increased amounts of lactose, therefore, the present method and process cheese product lead to significant productivity savings for such products, since the lactose would essentially be wasted, and since it replaces more expensive ingredients.

The method of the present invention also appears to improve the melting properties of the process cheese product. Although not wishing to be limited by theory, this improvement may be because the whey proteins in the dairy liquid are partially denatured and can, therefore, better express their functionalities. Again, without wishing to be bound by theory, it is thought that the well-controlled partial denaturation of whey proteins increases their water binding capacity, and promotes their distribution at the oil/water interface in the process cheese. The well-distributed whey proteins in the prepared emulsion system may be prevented from forming protein cross-linked conjugates (cross-linked through intermolecular disulfide linkages) and protein aggregates (bonded via hydrophobic interactions) during down-stream processing and storage. This appears to improve the meltability of the product. Therefore, the conditions applied for heat treatment are important aspects of the process of the invention. The overall process furthermore allows incorporating more whey protein into the cheese products without causing a limitation on the melting properties of the cheese.

The present invention also appears to provide increased stability against microbial contamination in view of the final heating step, since all the added ingredients are heat treated during the preparation of the emulsion system. This heating contributes to increased stability against microbial contamination.

Moreover, the present invention also appears to provide better microstructure of the process cheese product, as the process distributes all ingredients in the system. Microscopic examination of the product indicates that products prepared by the process of the invention contain smaller fat droplet size and have greater uniformity of the dispersion.

The following example is provided to illustrate the invention and not to limit it. Unless otherwise indicated, all percentages and ratios are by weight.

EXAMPLE. An experimental composition incorporating the features of the invention was prepared, and was compared with a control composition representative of process cheeses currently being marketed. Their respective compositions are presented in Table 1.

To prepare the control sample, first dry whey (containing 71.78% lactose, the sole source of lactose; Krafen, Kraft Foods, Glenview Ill.), whey protein concentrate (WPC34, Wisconsin Whey International, Juda, Wis.) containing 34% whey protein)and milk protein concentrate (NZ MPC-70, New Zealand Milk Products, Wellington, New Zealand) were mixed with water to make a wet mix. Separately, a cheese blend similar to that used in conventional process cheese was blended with colorants and heated to melting. Salt, acid, emulsifiers (MSP (monosodium phosphate) and DSP (disodium phosphate)), and melted butter were added to the melted cheese blend and mixed. Then the wet mix was added and mixed, and heated to 176° F. for 1 min, and the result was passed through a vacuum flash tank to eliminate air bubbles.

In order to prepare the inventive sample, milk protein concentrate NZ MPC-70, dry whey protein concentrate WPC34, and dry whey were mixed with water and heated to 153° F. and held for 10 min. The heating was discontinued, and melted butter was added with mixing. Sorbic acid, salt, fine flake edible sodium chloride, and emulsifiers (monosodium phosphate and disodium phosphate) were added, mixed for 10 min, and homogenized for 2 min further. Throughout this process, the dairy liquid component was not allowed to cool. In a separate vessel, the same cheese blend as used in the control and the colorants were melted. The homogenized dairy liquid mixture including the emulsifiers was added to the melted cheese blend and mixed. The resulting process cheese product was packaged and stored cold for at least three months.

Table 1 also provides the lactose content of each preparation.

TABLE 1

Ingredients of process cheese compositions

| Component | Control (%) | Inventive Sample (%) |
|---|---|---|
| Cheese blend | 46.00 | 42.34 |
| Colorants (APO, annatto) | 0.03 | 0.03 |
| Anhydrous butter | 6.31 | 6.38 |
| Water | 28.31 | 30.18 |
| Salt | 0.93 | 0.88 |
| Emulsifiers (MSP, DSP) | 2.77 | 2.63 |
| WPC 34 and NZ MPC-70 | 5.63 | 5.34 |
| Dry whey | 9.92 | 12.12 |
| Sorbic acid | 0.10 | 0.10 |
| Total | 100.00 | 100.00 |
| Lactose (%)[a] | 16.12 | 18.13 |

[a]Total lactose concentration in the moisture phase of the final process cheese.

The preparations identified in Table 1 were examined for important physical properties. The melting area was measured by heating a cheese sample 4.3 cm in diameter, weighing 12.7±0.1 g, in an oven set at 85° C. for 11 min. The area that had melted was scanned and evaluated. The melting temperature was determined by using a Mettler FP 83HT dropping point cell (Mettler Toledo Ltd., Hightstown, N.J.). The process cheese samples were incubated at room temperature for 24 h before the assay. The temperature in the incubating chamber was increased from 35° C. at the rate of 2° C. per min until the cheese sample melted. Penetration was measured using a penetrometer (Precision Scientific, Bellwood, Ill) at room temperature. The process cheese samples were incubated at room temperature for 24 h before the assay.

Texture, flavor, and overall scores were organoleptically evaluated by a group of 20 people using the scale 0 to 100 (100 indicates the best score). All samples were unknown to the evaluators.

The duplicate entries for melting area, melting temperature, penetration, and lactose crystals present are for duplicate preparations made about two weeks apart. The results are presented in Table 2.

TABLE 2

Properties of process cheese products.

| Property | Control | Inventive Sample |
|---|---|---|
| Melting area (mm$^2$) | 4441 | 4512 |
|  | 3607 | 3725 |
| Melting temperature (° C.) | 53.1 | 51.0 |
|  | 53.3 | 51.5 |
| Penetration (mm) | 13.5 | 13.5 |
|  | 12.5 | 12.7 |
| Lactose crystals present after 7 months refrigerated | None None | None None |
| Taste score: Texture | 73.1 | 73.3 |
| Taste score: Flavor | 71.1 | 70.3 |
| Taste score: Overall | 70.0 | 70.8 |

This example demonstrates the effects of incorporating increased lactose and whey protein into process cheese using the method of the invention. Even though the inventive sample contained 2.01 parts by weight more lactose in the moisture phase than did the control (see Table 1) and was above the supersaturation level, it had slightly better texture than did the control product. No lactose crystals were detected after storage for seven months at refrigerated temperature. (Of course, no lactose crystals were observed in the control since the lactose level was below the supersaturation level.) In addition, the inventive sample contained fewer curd specks and the fat droplet size was smaller than for the control preparation (not shown in Table 2). These results indicate that the crystallization of lactose in the inventive sample has been significantly retarded. The optimized distribution of ingredients in the inventive preparation has created a system with better stability of the phases in the emulsion, and has conferred satisfactory stability against microbial contamination and growth.

Production experience over several decades indicates that concentrations of lactose in the moisture phase of process cheeses greater than about 17% eventually leads to crystallization of the lactose after storage under refrigeration. Therefore, as a matter of practice the concentration of lactose has been limited to less than 17% in the moisture phase. In the present invention, the whey-containing dairy liquid is heated, and an emulsion with fat is formed, before being mixed with the melted cheese to form the process cheese. Using this procedure, the present invention succeeds in preserving lactose in solution at concentrations higher than the limit of 17%, corresponding to supersaturation (such as 18.13% in the Example). This is unexpected in the field of process cheese manufacture, and surprising to workers in the cheese making arts.

We claim:

1. A method of preparing a process cheese containing high levels of lactose wherein the process cheese remains significantly free of lactose crystals during storage at refrigeration temperatures, the method comprising:

(1) preparing a dairy liquid containing lactose at a concentration sufficient to provide a high level of lactose in the process cheese;

(2) heating the dairy liquid at a temperature and for a time sufficient to inhibit or prevent significant crystallization of the lactose after formation of the process cheese;

(3) blending the heated dairy liquid, without cooling, with fat, an emulsifier, salt, and a preservative to form a heated dairy blend;

(4) blending the heated dairy blend with a melted cheese to yield a melted cheese blend;

(5) heating the melted cheese blend at a temperature between about 170° F. and about 200° F. for between about one minute and ten minutes to provide the process cheese; and (6) packaging the process cheese;

wherein the process cheese contains at least 17 percent lactose in the moisture phase and remains significantly free of lactose crystals upon storage at refrigerated temperatures.

2. The method described in claim 1 wherein the dairy liquid is chosen from the group consisting of whole milk, reduced fat milk, skim milk, concentrated milk, ultrafiltered milk, whey protein concentrate, reconstituted dry whole milk, reconstituted dry reduced fat milk, reconstituted dry skim milk, protein fortified milk, calcium fortified milk, and mixtures thereof.

3. The method as described in claim 1, wherein the ratio of dairy liquid to melted cheese is about 1:1 to about 3:1 by weight.

4. The method as described in claim 1, wherein the dairy liquid is heated in step (2) at a temperature of about 130 to about 200° F.

5. The method as described in claim 4, wherein the dairy liquid is heated in step (2) for about 2 to about 100 minutes.

6. The method as described in claim 1, wherein the dairy liquid is heated in step (2) at a temperature of about 145 to about 170° F. for about 5 minutes to about 25 minutes.

7. The method as described in claim 1, wherein the fat comprises butter or butterfat.

8. The method as described in claim 1, wherein the emulsifier is chosen from the group consisting of sodium tripolyphosphate, monosodium phosphate, disodium phosphate, sodium acid pyrophosphate, sodium citrate, sodium metaphosphate, ammonium phosphate, ammonium citrate, and mixtures thereof.

9. The method as described in claim 1, wherein the preservative comprises sorbic acid or a salt thereof.

10. The method as described in claim 1, wherein the cheese is chosen from the group consisting of Cheddar, Colby, Monterey jack, Havarti, Muenster, Brick, Gouda, and mixtures thereof.

11. A lactose-containing process cheese stabilized against the formation of significant lactose crystals, said process cheese being prepared by a process comprising:

(1) preparing a dairy liquid containing lactose at a concentration sufficient to provide a high level of lactose in the process cheese;

(2) heating the dairy liquid at a temperature and for a time sufficient to inhibit or prevent significant crystallization of the lactose after formation of the process cheese;

(3) blending the heated dairy liquid, without cooling, with fat, an emulsifier, salt, and a preservative to form a heated dairy blend;

(4) blending the heated dairy blend with a melted cheese to yield a melted cheese blend;

(5) heating the melted cheese blend at a temperature between about 170° F. and about 200° F. for between about one minute and ten minutes to provide the process cheese; and (6) packaging the process cheese;

wherein the process cheese contains at least 17 percent lactose in the moisture phase and remains significantly free of lactose crystals upon storage at refrigerated temperatures.

12. The process cheese as described in claim 11, wherein the dairy liquid is chosen from the group consisting of whole milk, reduced fat milk, skim milk, concentrated milk, ultrafiltered milk, whey protein concentrate, reconstituted dry whole milk, reconstituted dry reduced fat milk, reconstituted dry skim milk, protein fortified milk, calcium fortified milk, and mixtures thereof.

13. The process cheese as described in claim 12, wherein the ratio of dairy liquid to melted cheese is about 1:1 to about 3:1 by weight.

14. The process cheese described in claim 12 wherein the fat comprises butter or butterfat.

15. The process cheese as described in claim 12, wherein the preservative comprises sorbic acid or a salt thereof.

16. The process cheese described in claim 12, wherein the cheese is chosen from the group consisting of Cheddar, Colby, Monterey jack, Havarti, Muenster, Brick, Gouda, and mixtures thereof.

17. The process cheese described in claim 12, wherein the dairy liquid is heated in step (2) at a temperature of about 130 to about 200° F.

18. The process cheese described in claim 17, wherein the dairy liquid is heated in step (2) for about 2 to about 100 minutes.

19. The process cheese described in claim 11, wherein the dairy liquid is heated in step (2) at a temperature of about 145 to about 170° F. for about 5 minutes to about 25 minutes.

20. The process cheese described in claim 12, wherein the dairy liquid is heated in step (2) at a temperature of about 145 to about 170° F. for about 5 minutes to about 25 minutes.

* * * * *